(12) United States Patent
Wyatt et al.

(10) Patent No.: US 9,064,322 B1
(45) Date of Patent: Jun. 23, 2015

(54) METHOD AND SYSTEM FOR STEERING ACCESS TO DISPLAY CONFIGURATION INFORMATION IN A MULTI-GPU SYSTEM

(75) Inventors: David Wyatt, San Jose, CA (US); Ludger Mimberg, San Jose, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 2197 days.

(21) Appl. No.: 12/104,400

(22) Filed: Apr. 16, 2008

(51) Int. Cl.
*G06F 15/16* (2006.01)
*G06T 1/20* (2006.01)

(52) U.S. Cl.
CPC .. *G06T 1/20* (2013.01); *G06F 15/16* (2013.01)

(58) Field of Classification Search
USPC ....................................................... 345/422
See application file for complete search history.

(56) References Cited

U.S. PATENT DOCUMENTS

| | | | |
|---|---|---|---|
| 6,903,706 B1 * | 6/2005 | Trottier et al. | 345/1.1 |
| 7,123,248 B1 * | 10/2006 | Lafleur | 345/204 |
| 2005/0083247 A1 * | 4/2005 | Juenger | 345/2.2 |
| 2005/0285865 A1 | 12/2005 | Diamond | |
| 2007/0046697 A1 | 3/2007 | Hussain | |
| 2007/0283175 A1 * | 12/2007 | Marinkovic et al. | 713/320 |
| 2008/0034238 A1 | 2/2008 | Hendry et al. | |
| 2008/0084359 A1 * | 4/2008 | Giannuzzi et al. | 345/1.1 |

OTHER PUBLICATIONS

I2C-Bus Specification, Version 2.1, Jan. 2000, published by Philips Semiconductors, pp. 1-46.*
Office Action in U.S. Appl. No. 12/104,393, mailed Apr. 11, 2011.
Office Action in U.S. Appl. No. 12/104,398, mailed Apr. 15, 2011.
Office Action in U.S. Appl. No. 12/104,400, mailed Apr. 15, 2011.

* cited by examiner

*Primary Examiner* — Edward Martello
(74) *Attorney, Agent, or Firm* — Artegis Law Group, LLP

(57) ABSTRACT

One embodiment of the present invention sets forth a method for accessing display configuration information in a multi-graphics-processing-unit (multi-GPU) system, which includes the steps of asserting a select signal to steer the display configuration information of a display device, which is coupled to a discrete GPU (dGPU), to a motherboard GPU (mGPU) in the multi-GPU system if dGPU is unavailable, and validating the display configuration information prior to availing the dGPU or the display device as an option to be selected.

19 Claims, 4 Drawing Sheets

METHOD AND SYSTEM FOR STEERING ACCESS TO DISPLAY CONFIGURATION INFORMATION IN A MULTI-GPU SYSTEM

BACKGROUND OF THE INVENTION

1. Field of the Invention

Embodiments of the present invention relate generally to multi-GPU systems and more specifically to a method and system for steering accessing to display configuration information in a multi-GPU system.

2. Description of the Related Art

Unless otherwise indicated herein, the approaches described in this section are not prior art to the claims in this application and are not admitted to be prior art by inclusion in this section.

To satisfy users' continued demands for graphics applications that offer rich visual effects and interactive features, various multi-graphics-processing-unit (multi-GPU) solutions have been proposed to handle the computationally-intensive operations that are needed in such graphics applications. One solution is to supplement the integrated graphics subsystem of a main computing system with an enhanced graphics subsystem. So, the main computing system can make use of the enhanced graphics subsystem to perform all rendering or assist in accelerating rendering and even drive the processed data in the frame buffer of the enhanced graphics subsystem to a display device attached to the enhanced graphics subsystem. Such a display device is herein referred to as an "add-on display device" and is often the preferred display device for the multi-GPU system, because it supports different technologies that address some of the shortcomings in the older analog display devices. Also, the GPU in the integrated graphics subsystem is herein referred to as the motherboard GPU (mGPU), and the GPU in the enhanced graphics subsystem is referred to as the discrete GPU (dGPU).

However, there currently lacks a mechanism to seamlessly transition between the integrated graphics subsystem and the enhanced graphics subsystem. In particular, in a conventional multi-GPU solution, switching between these two subsystems requires a cumbersome process of rebooting and also re-enumerating the various display devices that are attached to the two graphics subsystems. Furthermore, the dGPU in the enhanced graphics subsystem is sometimes powered-down in the conventional multi-GPU solution to reduce power consumption. During this power-down period in which the dGPU is unavailable, the add-on display device also becomes inaccessible. In other words, the current multi-GPU solution is unable to detect hot-plug events (e.g., attachment or detachment of the add-on display device) or receive any specification data associated with the add-on display device via the Display Data Channel or an auxiliary channel (collectively, DDC/AUX) while the dGPU is turned-off, further complicating the process of switching between the two graphics subsystems.

As the foregoing illustrates, what is needed is an improved way of accessing the add-on display device by utilizing a main component in a multi-GPU system to enable the seamless transitions between the various graphics subsystems in a multi-GPU system and address at least the problems set forth above.

SUMMARY OF THE INVENTION

A method and system for accessing display configuration information in a multi-graphics-processing-unit (multi-GPU) system is disclosed. One embodiment of the present invention sets forth a method, which includes the steps of asserting a select signal to steer the display configuration information of a display device, which is coupled to a discrete GPU (dGPU), to a motherboard GPU (mGPU) in the multi-GPU system if dGPU is unavailable, and validating the display configuration information prior to availing the dGPU or the display device as an option to be selected.

One advantage of the disclosed method and system is the ability to utilize a main component, such as the mGPU, in the multi-GPU system to access the display device that is owned by the dGPU, even when the dGPU is powered-down.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the drawings. It is to be noted, however, that the drawings illustrate only typical embodiments of this invention and are therefore not to be considered limiting of its scope, for the invention may admit to other equally effective embodiments.

DETAILED DESCRIPTION

Figure 1A:
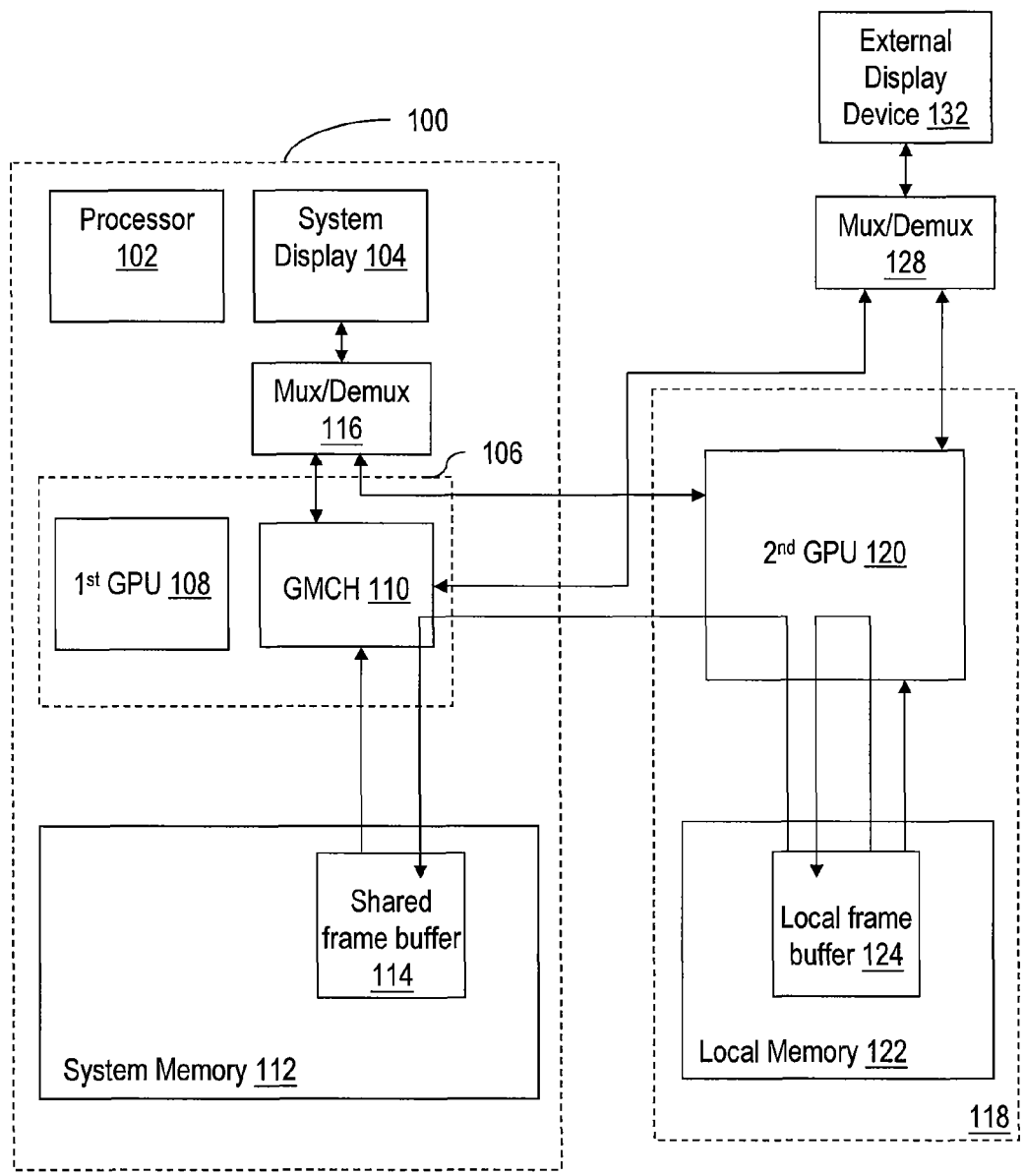
FIG. 1A is a simplified block diagram illustrating some components in a multi-GPU system that enable a first graphics processing unit (GPU) to access an external display device attached to another GPU, according to one embodiment of the present invention.

FIG. 1A is a simplified block diagram illustrating some components in a multi-GPU system that enables a first graphics processing unit (GPU) 108 to access an external display device attached to another GPU, according to one embodiment of the present invention. Here, the first GPU 108, also referred to as a motherboard GPU (mGPU), is configured to access an external display device 132 attached to a second GPU 120, also referred to as a discrete GPU (dGPU). It is worth noting that by giving the first GPU 108 access to the external display device 132, even if the second GPU 120 is unavailable, a computing system 100 in the multi-GPU system is then able to support seamless switching (e.g., via hot-key switching or some other user interfaces) among the various display devices that are directly or indirectly coupled to it. More precisely, the computing system 100 is configured to enumerate and validate the capabilities of a display device that is owned by the second GPU 120, such as the illustrated external display device 132, prior to making such a display device available to be selected.

The computing system 100 includes a processor 102, host components 106, system memory 112, and a shared frame buffer 114. The host components 106 further includes a graphics and memory controller hub (GMCH) 110 and the first GPU 108. The multi-GPU system also includes an enhanced graphics subsystem 118, which contains local memory 122, a local frame buffer 124, and the second GPU 120. In addition, the computer system 100 mainly supports a system display 104, while the enhanced graphics subsystem 118 mainly supports an external display device 132.

The system memory 112 in the computing system 100 stores programming instructions and data for the processor 102 and the host components 106 to execute and operate on. In other implementations, the processor 102, the first GPU 108, the GMCH 110, or any combination thereof, may be integrated into a single processing unit. Further, the functionality of the first GPU 108 may be included in the GMCH 110 or in some other type of special purpose processing unit or co-processor. In such embodiments, software instructions may reside in memory systems other than the system memory 112 and may be executed by processing units other than the processor 102. It should also be apparent to a person with ordinary skills in the art to recognize that the GMCH 110 may include multiple discrete integrated circuits that work together to serve different types of I/O agents, such as a Northbridge and a Southbridge.

Moreover, in one implementation, the second GPU 120 renders objects to the local frame buffer 124 and copies the rendered objects from the local frame buffer 124 to the shared frame buffer 114 via the interconnect between the GMCH 110 and the second GPU 120. In one operating mode, the first GPU 108 ensures the data in the shared frame buffer 114 is scanned out to the system display 104. In another operating mode, the second GPU 120 scans out the rendered objects from the local frame buffer 124 to the external display device 132. In yet another operating mode, if the second GPU 120 is powered down, the first GPU 108 renders objects to the shared frame buffer 114 and selectively scans out the data in the shared frame buffer 114 to the system display 104, the external display device 132, or a combination of the these display devices. More importantly, by utilizing a number of multiplexers and demultiplexers (mux/demux) such as mux/demux 116 and mux/demux 128, the first GPU 108 is able to still gain access to the external display device 132 even when the second GPU 120 is powered down. The mechanisms for permitting the first GPU 108 to access the external display device 132 and also for utilizing the display configuration information obtained from the external display device 132 are further detailed in subsequent paragraphs.

In one configuration, the computing system 100 is a mobile device, such as a notebook computer, and is configured with a first graphics subsystem 106 and the mGPU 108. The enhanced graphics subsystem 118 is a docking system with the dGPU 120. In addition, a system display 104 here corresponds to the internal display panel of the notebook computer. The notebook computer may connect to the docking system via a wired interconnect. Some examples of the wired interconnect include, without limitation, Peripheral Component Interconnect (PCI) Express Graphics (PEG) port and Mobile PCI Express Module (MXM) 2.0. Alternatively, this interconnect can be wireless, as long as it supports sufficient bandwidth.

In another configuration, the computing system 100 is a desktop system and is still configured with the first graphics subsystem 106 and the mGPU 108. The enhanced graphics subsystem 118 is an add-on system with the dGPU 120. Here, the system display 104 corresponds to the display panel that is directly supported by the desktop system. It should be apparent to a person with ordinary skills in the art to recognize that the aforementioned multi-GPU systems can be implemented in many other configurations without exceeding the scope of the claimed invention.

Figure 1B:
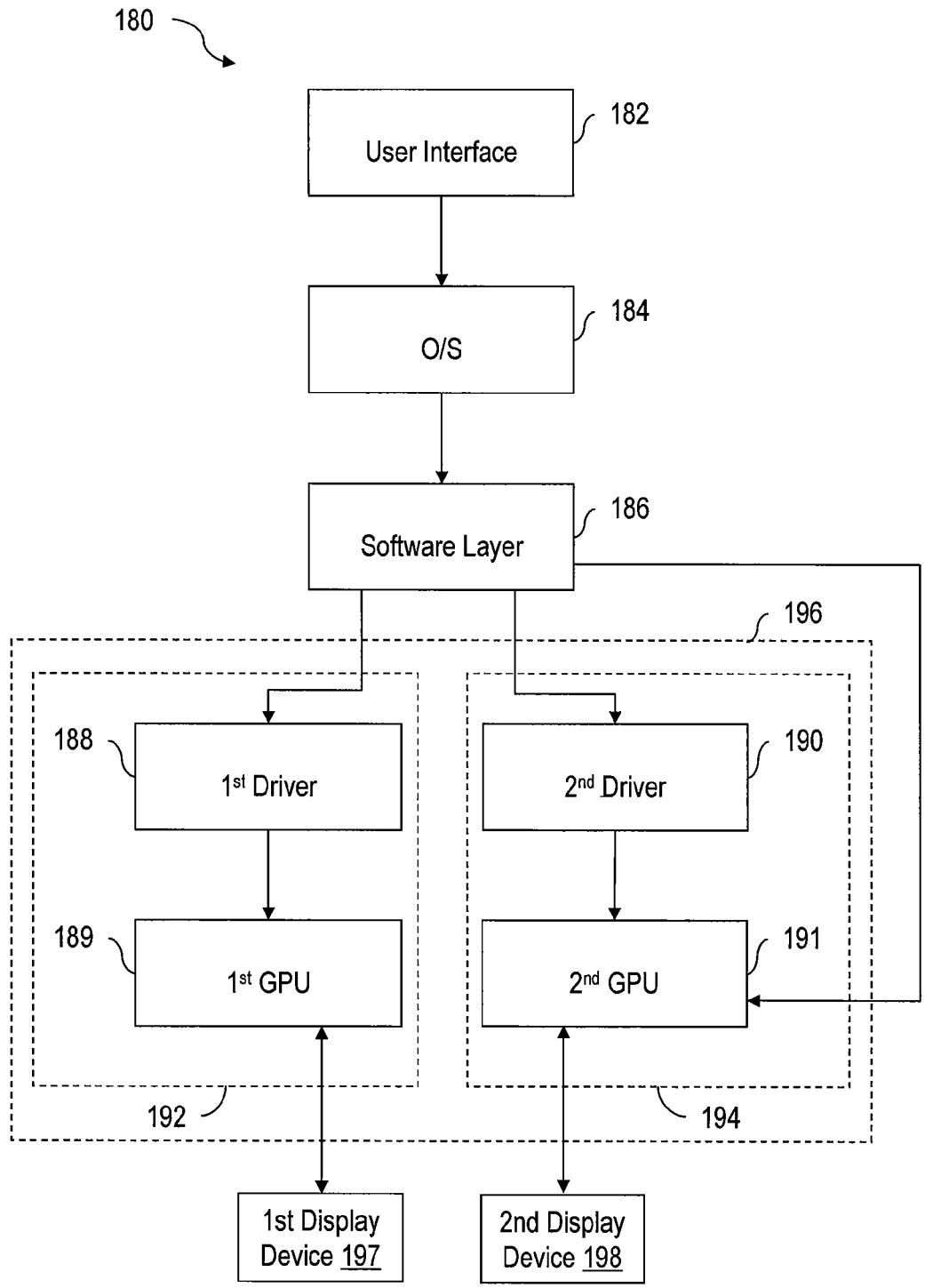
FIG. 1B is a software stack to be executed on a computing system to enable an mGPU to access an external display device as shown in FIG. 1A, according to one embodiment of the present invention.

FIG. 1B is a software stack 180 to be executed on the computing system 100 to enable the first GPU 108 to access the external display device 132 of FIG. 1A, according to one embodiment of the present invention. As shown, the software stack 180 includes a software layer 186 disposed between an application, such as a user interface 182, and a plurality of drivers, such as a first driver 188 and a second driver 190. The software layer 186 may also include or interact with one or more drivers. In one implementation, the software layer 186 interacts with an Advanced Configuration and Power Interface (ACPI) driver typically in an operating system (O/S) 184 to obtain power management state information or a list of all enumerated display devices. The user interface 182 operates on top of this O/S 184. Here, the O/S 184 refers to the O/S for the computing system 100. A first driver 188 in one implementation is a graphics driver adapted for interfacing a first GPU 189, corresponding to the first GPU 108 of FIG. 1A, and a second driver 190 is also a graphics driver adapted for interfacing a second GPU 191, corresponding to the second GPU 120. Each set of a driver and a GPU is referred to as a subsystem. Thus, the first driver 188 with the first GPU 189 is a subsystem 192, and the second driver 190 with the second GPU 191 is a subsystem 194. The subsystem 192 and the subsystem 194 are further coupled to a first display device 197 and a second display device 198, respectively. Some of the main functions of the software layer 186 include wrapping both of these subsystems 192 and 194 so that they appear as a single graphics subsystem 196 to the O/S 184 and also causing a select signal to be asserted so that the first GPU 189 can access the second display device 198, even when the second GPU 191 is turned-off.

Figure 2:
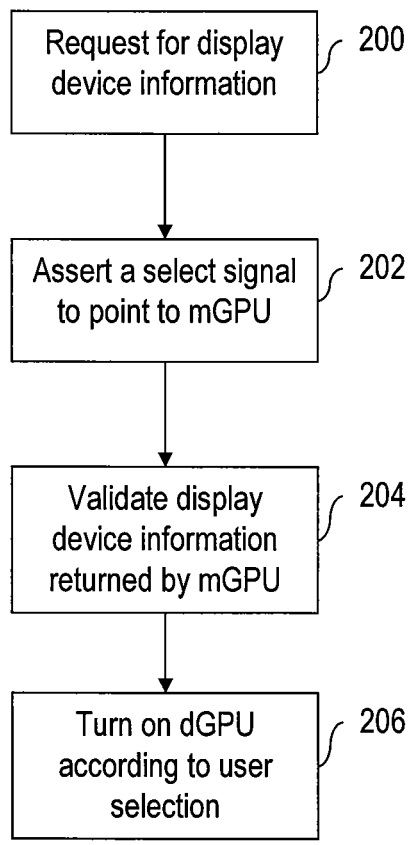
FIG. 2 is a flow chart illustrating method steps of providing a user with display device options to choose from, according to one embodiment of the present invention.

In conjunction with the software stack 180 shown in FIG. 1B, FIG. 2 is a flow chart illustrating method steps of providing a user with display device options to choose from, according to one embodiment of the present invention. Here, before the user interface 182 offers any display device option to the user, in step 200, it requests for display device information from all the display devices that are accessible by the O/S 184. The O/S 184 then proceeds to query the software layer 186 for the display device information. As mentioned above, the O/S 184 only recognizes the software layer 186 interfacing with the graphics subsystem 196 and does not know about the existence of the subsystems 192 and 194. Thus, the software layer 186 needs to interact with the various drivers to get the requested information for the O/S 184. Suppose the subsystem 194 is powered-down. In step 202, the ACPI driver (not shown in FIG. 1B), which interacts with the software layer 186, recognizes the power states of the subsystems 192 and 194 and causes a select signal to be asserted to point the second display device 198 to the first GPU 189. Thus, even though the subsystem 194 is powered down and is thus unavailable, the first GPU 189 continues to have access to information associated with the second display device 198 (e.g., hot-plug signals, specifications of the display device, Extended Display Identification Data (EDID), and others).

After obtaining the information associated with both of the first display device 197 and the second display device 198, the first GPU 189 sends the information to the software layer 186, which then relays the information to the O/S 184. In one implementation, the O/S 184 in step 204 further validates the capabilities of the display devices based on the retrieved EDIDs, each of which includes information such as manufacturer name, product type, phosphor or filter type, timings supported by the display device, display size, luminance data, and pixel mapping data. Also, the O/S 184 can make use of the returned EDID information to confirm the presence of the first display device 197 and the second display device 198.

Suppose the capabilities and also the presence of both of the first display device 197 and the second display device 198 are verified to be supported by the computing system 100. The user interface 182 then makes both of these display devices available to the user. If the user actually selects the second display device 198, then in step 206, the software layer 186 interacts with the ACPI driver to turn the second GPU 191 on and also point the second display device 198 back to the second GPU 191.

Figure 3:
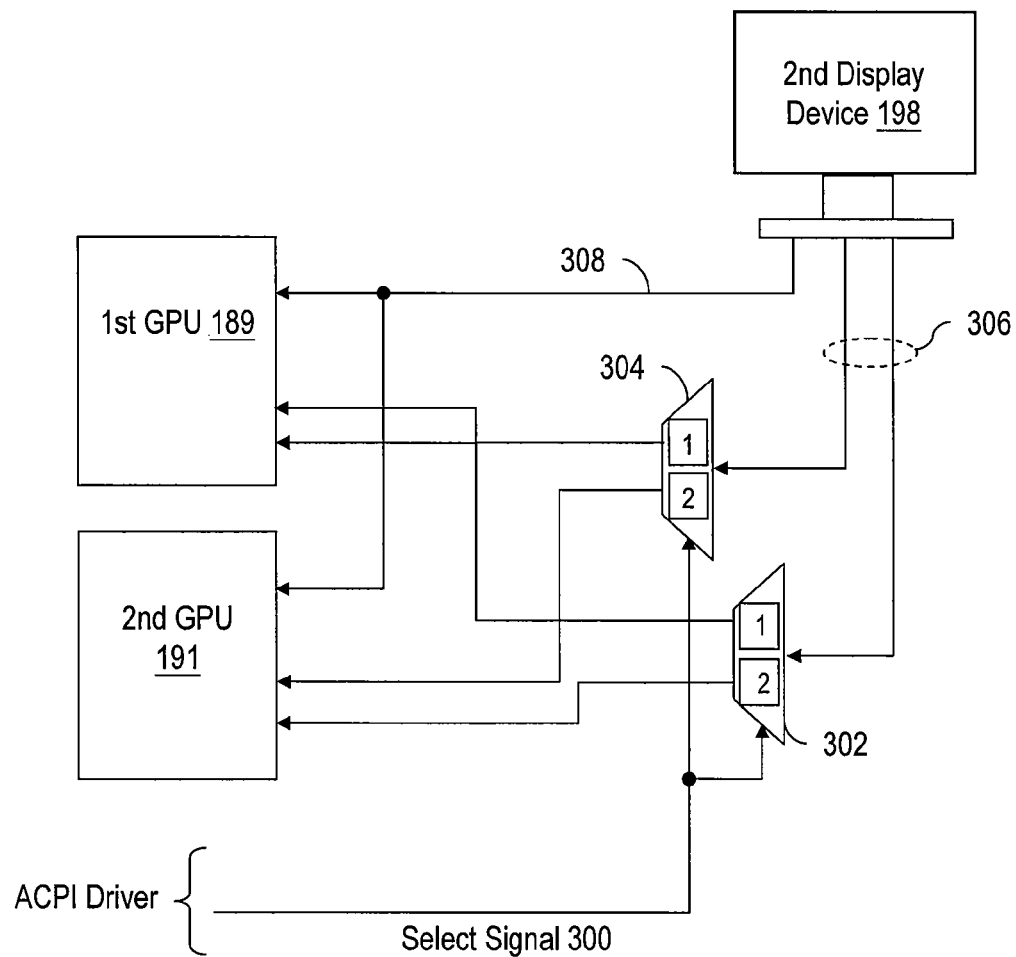
FIG. 3 is a block diagram further illustrating how accesses to an external display device is steered from one GPU to another, according to one embodiment of the present invention.

Again in conjunction with FIG. 1B, FIG. 3 is a block diagram further illustrating how accesses to an external display device, such as the second display device 198, is steered from one GPU to another, according to one embodiment of the present invention. Here, a demultiplexer 302 and a demultiplexer 304, corresponding to a part of the mux/demux 128 of FIG. 1A, are added to direct data on DDC/AUX 306 from the second display device 198 to the GPUs. To allow the first GPU 189 to access the second display device 198 even if the second GPU 191 is unavailable, as discussed above, the ACPI driver asserts a select signal 300 to steer the second display device 198 to the first GPU 189. Specifically, the select signal 300 is asserted to select the output 1 of the demultiplexer 302 and the demultiplexer 304, if the second GPU 191 is unavailable. On the other hand, if the second GPU 191 is powered back up, then the select signal 300 is asserted to instead select the output 2 of the demultiplexer 302 and the demultiplexer 304. In one implementation, certain pins of the first GPU 189, such as its general purpose input/output (GPIO) ports, are utilized to receive the data from the second display device 198. In addition, although both the first GPU 189 and the second GPU 191 receive hot-plug signals 308, the GPUs still rely on the information derived from the DDC/AUX 306, such as the EDID of the second display device 198.

While the forgoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention. Therefore, the above examples, embodiments, and drawings should not be deemed to be the only embodiments, and are presented to illustrate the flexibility and advantages of the present invention as defined by the following claims.

We claim:

1. A method for accessing display configuration information in a multi-graphics-processing-unit (multi-GPU) system, the method comprises:
asserting a select signal to steer the display configuration information of a display device, coupled to a discrete GPU (dGPU), to a motherboard GPU (mGPU) in the multi-GPU system if dGPU is unavailable; and
validating the display configuration information prior to availing the dGPU or display device as an option to be selected.

2. The method of claim 1, wherein the asserting step further comprising inspecting power management state information and a list of already enumerated display devices before asserting the select signal.

3. The method of claim 1, wherein the validating step further comprising using the display configuration information to verify the presence of the display device prior to availing the dGPU or display device as an option to be selected.

4. The method of claim 3, further comprising powering on the dGPU to drive the display device if the display device is selected.

5. The method of claim 1, further comprising abstracting the handling of a first graphics subsystem having the mGPU and a second graphics subsystem having the dGPU so that the first graphics subsystem and the second graphics subsystem appear as a third graphics subsystem to an operating system for the multi-GPU system.

6. The method of claim 1, wherein the display configuration information refers to the extended display identification data of the display device.

7. A multi-graphics-processing-unit (multi-GPU) system configured to access display configuration information of a display device, the multi-GPU system comprises:
a host computer with system memory, a processor, and a first graphics subsystem having a first GPU; and
a second graphics subsystem having a second GPU, coupled to the display device, wherein the processor is configured to
assert a select signal to steer the display configuration information of the display device to the first GPU if the second GPU is unavailable, and
validate the display configuration information prior to availing the second GPU or display device as an option to be selected.

8. The multi-GPU system of claim 7, wherein the multi-GPU system further includes a demultiplexer having an input coupled to a display data channel of the display device, a first output coupled to the first GPU, and a second output coupled to the second GPU and configured to receive the select signal.

9. The multi-GPU system of claim 8, wherein the first output of the demultiplexer is coupled to a general purpose input/output (GPIO) port of the first GPU.

10. The multi-GPU system of claim 7, wherein the processor is further configured to inspect power management state information and a list of already enumerated display devices before asserting the selection signal.

11. The multi-GPU system of claim 7, wherein the processor is further configured to use the display configuration information to verify the presence of the display device prior to availing the second GPU or display device as an option to be selected.

12. The multi-GPU system of claim 11, wherein the processor is further configured to trigger the powering on of the second GPU to drive the display device if the display device is selected.

13. The multi-GPU system of claim 7, wherein the display configuration information refers to the extended display identification data of the display device.

14. A non-transitory computer-readable medium containing a sequence of instructions for a software stack, which when executed by a processor in a multi-graphics-processing-unit (multi-GPU) system, causes the processor to:

assert a select signal to steer the display configuration information of a display device, coupled to a discrete GPU (dGPU), to a motherboard GPU (mGPU) in the multi-GPU system if dGPU is unavailable; and validate the display configuration information prior to availing the dGPU or display device as an option to be selected.

15. The non-transitory computer-readable medium of claim 14, further containing a sequence of instructions for the software stack, which when executed by the processor, causes the processor to further inspect power management state information and a list of already enumerated display devices before asserting the select signal.

16. The non-transitory computer-readable medium of claim 14, further containing a sequence of instructions for the software stack, which when executed by the processor, causes the processor to further use the display configuration information to verify the presence of the display device prior to availing the dGPU or the display device as an option to be selected.

17. The non-transitory computer-readable medium of claim 16, further containing a sequence of instructions for the software stack, which when executed by the processor, causes the processor to further trigger the powering on of the dGPU to drive the display device if the display device is selected.

18. The non-transitory computer-readable medium of claim 14, further containing a sequence of instructions for the software stack, which when executed by the processor, causes the processor to further abstract the handling of a first graphics subsystem having the mGPU and a second graphics subsystem having the dGPU so that the first graphics subsystem and the second graphics subsystem appear as a third graphics subsystem to an operating system for the multi-GPU system.

19. The non-transitory computer-readable medium of claim 14, wherein the display configuration information refers to the extended display identification data of the display device.

* * * * *